(12) United States Patent
Huang (10) Patent No.: US 11,120,939 B2
(45) Date of Patent: Sep. 14, 2021

(54) TEN-PHASE AUTO TRANSFORMER RECTIFIER UNIT

(71) Applicant: The Boeing Company, Chicago, IL (US)

(72) Inventor: Jian Huang, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/588,648

(22) Filed: Sep. 30, 2019

(65) Prior Publication Data

US 2021/0098188 A1   Apr. 1, 2021

(51) Int. Cl.
| | |
|---|---|
| H01F 30/00 | (2006.01) |
| H01F 30/14 | (2006.01) |
| H02M 7/06 | (2006.01) |
| H01F 30/02 | (2006.01) |

(52) U.S. Cl.
CPC ............. *H01F 30/14* (2013.01); *H01F 30/02* (2013.01); *H02M 7/06* (2013.01)

(58) Field of Classification Search
CPC ........... H01F 30/14; H01F 30/02; H02M 7/06
See application file for complete search history.

(56) References Cited

U.S. PATENT DOCUMENTS

| | | | | |
|---|---|---|---|---|
| 4,779,181 A | * | 10/1988 | Traver | H02M 5/14 |
| | | | | 336/5 |
| 7,772,953 B2 | | 8/2010 | Huang et al. | |
| 7,772,954 B2 | | 8/2010 | Huang et al. | |
| 2010/0148899 A1 | * | 6/2010 | Huang | H01F 30/14 |
| | | | | 336/12 |
| 2014/0218982 A1 | * | 8/2014 | Abdollahi | H02M 7/08 |
| | | | | 363/64 |
| 2019/0392985 A1 | * | 12/2019 | Huang | H02M 5/42 |

OTHER PUBLICATIONS

McClyman, "Transformer and Inductor Design Handbook," Third Edition, Revised and Expanded, Copyright 2004, Marcel Dekker, Inc., 533 pages. http://ebook.pldworld.com/_eBook/-Power%20Electronics-/TRANSFORMER%20and%20INDUCTOR%20DESIGN%20HANDBOOK%203rd%20Edition,%20Revised%20and%20Expanded/ourdev_725050HHOGA4.pdf.

* cited by examiner

*Primary Examiner* — Adolf D Berhane
*Assistant Examiner* — Afework S Demisse
(74) *Attorney, Agent, or Firm* — Yee & Associates, P.C.

(57) ABSTRACT

An auto transformer rectifier unit (ATRU) is provided. The ATRU comprises a transformer configured to receive a three-phase alternating current input and produce a ten-phase alternating current output, and a rectifier configured to receive the ten-phase alternating current output and output a bipolar direct current.

20 Claims, 7 Drawing Sheets

TEN-PHASE AUTO TRANSFORMER RECTIFIER UNIT

BACKGROUND INFORMATION

1. Field

The present disclosure relates generally to transformer topologies and, more specifically, to an auto transfer rectifier unit topology to convert three-phase variable frequency alternating current to bipolar direct current.

2. Background

In many applications, especially shipboard and aircraft applications, high voltage direct current (DC) power is used to power motor controllers. Typically, a three-phase alternating current (AC) voltage of 235 Volts RMS (root mean square) is generated in a ship or an aircraft. The generated AC voltage is applied to an auto transformer rectifier unit (ATRU) and rectified to generate a DC voltage of +/−270 Volts. The rectified DC voltage from the ATRU is then used to power motor controllers. For aircraft, a constant frequency power at 400 Hz is required for the fuel pump and no-break power transfer between two transfer buses. The output voltage of the motor controllers is limited by the rectified DC voltage of the ATRU. It is desirable to increase the voltage output of the motor controllers.

In order to increase the output voltage of the motor controllers, various approaches have been tried. One approach is to provide a higher input AC voltage. This approach has shortcoming because if the input AC voltage is increased, due to increased power, the overall insulation level of whole ship or aircraft has to be increased. Increased input AC voltage can also lead to additional challenges like corona, high voltage spikes and component breakdown.

Another approach has been to cod a step-up autotransformer before the motor controller to get higher rectified output DC voltage or after the motor controller to get higher output AC voltage. Adding an additional step-up transformer before or after the motor controller adds additional heavy magnetic components to the power generation system. Particularly in shipboard or aircraft applications, additional autotransformers may significantly add to the weight of the electrical subsystem and hence may not be desirable.

Therefore, it would be desirable to have a method and apparatus that take into account at least some of the issues discussed above, as well as other possible issues.

SUMMARY

An illustrative embodiment of the present disclosure provides an auto transformer rectifier unit (ATRU). The ATRU comprises a transformer configured to receive a three-phase alternating current input and produce a ten-phase alternating current output, and a rectifier configured to receive the ten-phase alternating current output and output a bipolar direct current.

Another illustrative embodiment provides transformer comprising a first primary winding comprising four sub-primary windings, a second primary winding comprising four sub-primary windings, and a third primary winding comprising five sub-primary windings. Two secondary windings are coupled to the first primary winding, and two secondary windings are coupled to the second primary winding. Four secondary windings are coupled to the third primary winding. The first primary winding, second primary winding, and third primary winding are coupled together to form a delta configuration. Exterior junctions between the first primary winding, second primary winding, and third primary winding are each configured to receive and alternating current input. The secondary windings, one interior junction on the first primary winding, and one interior junction on the second primary winding are configured to output phase-shifted alternating currents that are offset relative to each other by one-tenth of a cycle in phase.

Another illustrative embodiment provides an auto transformer rectifier unit comprising a transformer configured to receive input of three alternating currents offset relative to each other by a third of a cycle in phase and output ten phase-shifted alternating current offset relative to each other by one-tenth of a cycle in phase. The transformer comprises a first primary winding, a second primary winding, and a third primary winding coupled together to form a delta configuration, as well as a number of secondary windings coupled to the primary windings. The transformer also comprises a rectifier configured to receive the ten phase-shifted alternating currents from the transformer and output a bipolar direct current.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that a common approach in existing designs uses a common mode inductor at the ATRU output side to filter out the common mode voltages that are generated by the ATRU. The common mode voltage must be reduced to the acceptable level for the inverter operating.

The illustrative embodiments recognize and take into account that the second common approach uses a common mode inductor at the inverter output side to reduce the common mode voltages generated by both the ATRU and inverter. Both existing approaches produce negative impacts, particularly for aircraft, including increased weight and cost, and reduced reliability.

The illustrative embodiments provide an ATRU topology to convert three-phase variable frequency AC to bipolar DC by eliminating the common mode voltage on the rectified output DC buses. The ATRU output common mode inductor is eliminated, and the inverter output common mode inductor is reduced in size from prior designs or eliminated altogether. The topology of the illustrative embodiments converts symmetrical three-phase input to symmetrical 10-phase output.

Figure 1:
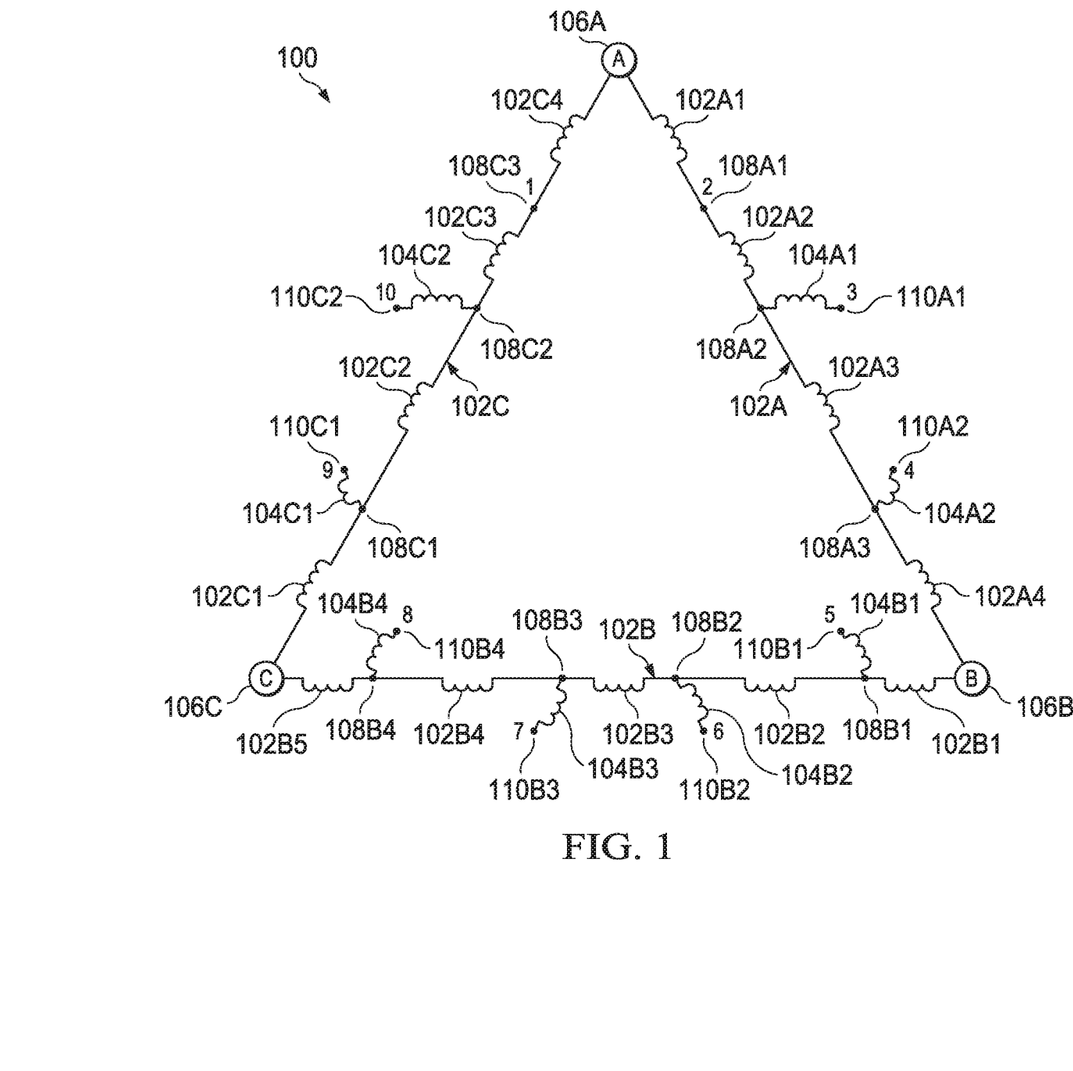
FIG. 1 depicts an illustration of a winding diagram for a transformer in accordance with an illustrative embodiment.

FIG. 1 depicts an illustration of a winding diagram for a transformer in accordance with an illustrative embodiment. Transformer 100 is a 10-phase phase or 20-pulse pulse multi-phase transformer that comprises a group of primary windings 102A, 102B, 102C, and a group of secondary windings 104A, 104B, 104C.

Each of primary windings 102A, 102B, 102C comprises a number of sub-primary windings coupled in series. A junction of two sub primary windings defines an interior junction. For example, primary winding 102A includes sub-primary windings 102A1, 102A2, 102A3, 102A4 coupled in series to define interior junctions 108A1, 108A2, 108A3. Similarly, primary winding 102B includes sub primary windings 102B1, 102B2, 102B3, 102B4, 102B5 coupled in series to define interior junctions 108B1, 108B2, 108B3, 108B4. Primary winding 102C includes sub-primary windings 102C1, 102C2, 102C3, 102C4 coupled in series to define interior junctions 108C1, 108C2, 108C3.

Each end of each primary winding is coupled to the ends of another primary winding to form a delta configuration. The junction of two primary windings defines an exterior junction. For example, primary winding 102A is coupled to primary winding 102C at one end to define exterior junction 106A and coupled to primary winding 102B at the other end to define exterior junction 106B. Similarly, primary windings 102B and 102C are coupled together to define exterior junction 106C.

Each of primary windings 102A, 102B, 102C is configured to receive a phase of a multi-phase input voltage at the exterior junctions 106A, 106B, 106C. Primary winding 102A receives a phase at exterior junctions 106A and 106B. Primary winding 102B receives another phase at exterior junctions 106B and 106C. Primary winding 102C receive another phase at exterior junctions 106C and 106A.

The secondary windings 104A1-104C2 are physically coupled to the primary windings 102A, 102B, 102C. Secondary windings 104A1, 104A2 are physically coupled to primary winding 102A at interior junctions 108A2 and 108A3, respectively. Secondary windings 104B1, 104B2, 104B3, 104B4 are physically coupled to primary winding 102B at interior junctions 108B1, 108B2, 108B3, and 108B4, respectively. Secondary windings 104C1, 104C2 are physically coupled to primary winding 102C at interior junctions 108C1 and 108C2, respectively.

Windings that are parallel to each other are magnetically coupled. Therefore, secondary windings 104B1, 104B2, and 104C1 are magnetically coupled to primary winding 102A. Similarly, secondary windings 104A1 and 104C2 are magnetically coupled to primary winding 102B. Secondary windings 104A2, 104B3, and 104B4 are magnetically coupled to primary winding 102C.

Transformer 100 produces output voltages at interior junctions 108A1 and 108C3 and the respective distal ends 110A1-110C2 of secondary windings 104A1-104C2 that are approximately the same. The phase angle difference of the output voltage between any two adjacent output points is approximately the same (i.e. 36°, see below).

The various windings and sub-windings shown in FIG. 1 have exemplary numbers of turns, with some of the windings or sub-windings having substantially the same number of turns. For example, sub-primary windings 102A1 and 102C4 have N1 turns. Similarly, sub-primary windings 102A2 and 102C3 have N2 turns. Sub-primary windings 102A3 and 102C2 have N3 turns. Sub-primary windings 102A4 and 102C1 have N4 turns. Sub-primary windings 102B1 and 102B5 have N5 turns. Sub-primary windings 102B2 and 102B4 have N6. Sub-primary winding 102B3 alone has N7 turns.

Secondary windings 104A1 and 104C2 have N8 turns. Similarly, secondary windings 104A2 and 104C1 have N9 turns. Secondary windings 104B1 and 104B4 have N10 turns. Secondary windings 104B2 and 104B3 have N11 turns.

Figure 2:
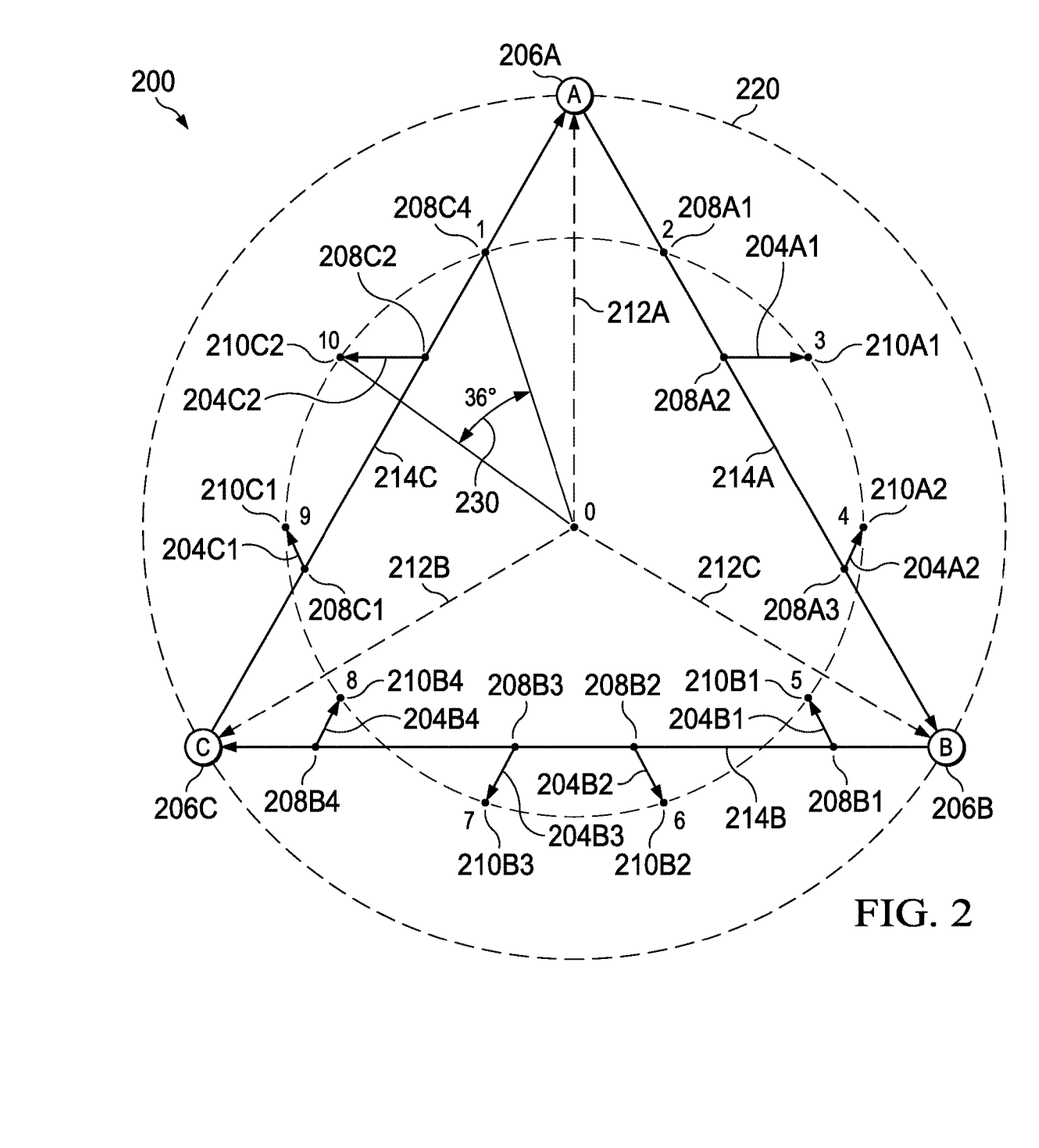
FIG. 2 depicts an illustration of a phasor diagram of a transformer in accordance with an illustrative embodiment.

FIG. 2 depicts an illustration of a phasor diagram of a transformer in accordance with an illustrative embodiment. Phasor diagram 200 is an exemplary phasor diagram for multi-phase transformer 100 in FIG. 1. As one skilled in the art appreciates, the phasor diagram graphically depicts various aspects the multi-phase transformer. For example, the phasor diagram depicts the relationship between the primary and secondary windings. More specifically, various windings are represented by lines in a phasor diagram, and the length of a line represents the number of turns of the winding. The lines in a phasor diagrams are vector lines depicting the respective vectors of the induced voltages. Two vector lines that are parallel to each other represent magnetic coupling between corresponding two windings. The radial length of each segment between two junctions along the circumference represents the phase angle difference between the output signals at those junctions, with the full circle representing 360 degrees. The common center of the circle represents the effective electrical neutral position.

The phasor diagram 200 includes a first circle 220 and a second circle 230, both having a common center 0. The sides AB, BC and CA of triangle ABC represent the primary windings 102A-102C in FIG. 1, respectively. For ease of cross-reference, the labeling scheme used in FIG. 2 parallels corresponding elements in FIG. 1. For example, junction 208A1 in FIG. 2 corresponds to interior junction 108A1 in FIG. 1, vector line 204A1 corresponds to secondary winding 104A1, junction 210A1 corresponds to distal end 110A1 of secondary winding 104A1, etc.

The lengths of lines between points in FIG. 2 represent the number of respective turns in the corresponding windings and sub-windings in FIG. 1. For example, the length between points 206A and 208A1 on side AB represents number of windings N1 in sub-primary sub-winding 102A1. Similarly, the length between points 208A1 and 208A2 represents number of windings N2 in sub-primary winding 102A2. The length between points 208A2 and 210A1 represents the number of windings N8 in secondary winding 104A1, etc.

The lines 212A, 212B, and 212C represent the input AC voltage Vin applied to the exterior junctions A, B and C, respectively, of the primary windings. The three phases of input voltage Vin are represented respectively by lines 212A, 212B, and 212C with each phase separated by approximately 120 degrees.

As previously described, the lines in a phasor diagram depict the vectors of the induced voltage. For example, the vector of induced voltage in primary windings 102A, 102B and 102C are depicted by the arrows 214A, 214B, and 214C, respectively. Similarly, the arrows on lines 204A1-204C2, corresponding to secondary windings 104A1-104C2, represent the respective vectors of induced voltage.

The vectors of induced voltage in the secondary windings are such that they are either in phase or 180 degrees out of phase with the vector of induced voltage in a primary winding to which they are magnetically coupled. The vector of induced voltage in each of the secondary windings is in phase with the vector of induced voltage in a primary winding other than the primary winding to which the secondary winding is coupled. For example, the vector of induced voltage in the secondary winding 104A1 depicted by line 204A1 is in phase with the vector of induced voltage in the primary winding 102B depicted by line BC.

As shown in FIG. 2, the induced voltages at the ten points 208A1, 208C4, and 210A1-210C2 around circle 230 have a phase angle difference of 36° (i.e. one tenth of a cycle) between them. As such, FIG. 2 illustrates how the multi-phase transformer 100 in FIG. 1 transforms a three-phase 235 Vrms AC input current into a 10-phase 155 Vrms AC output current.

Figure 3:
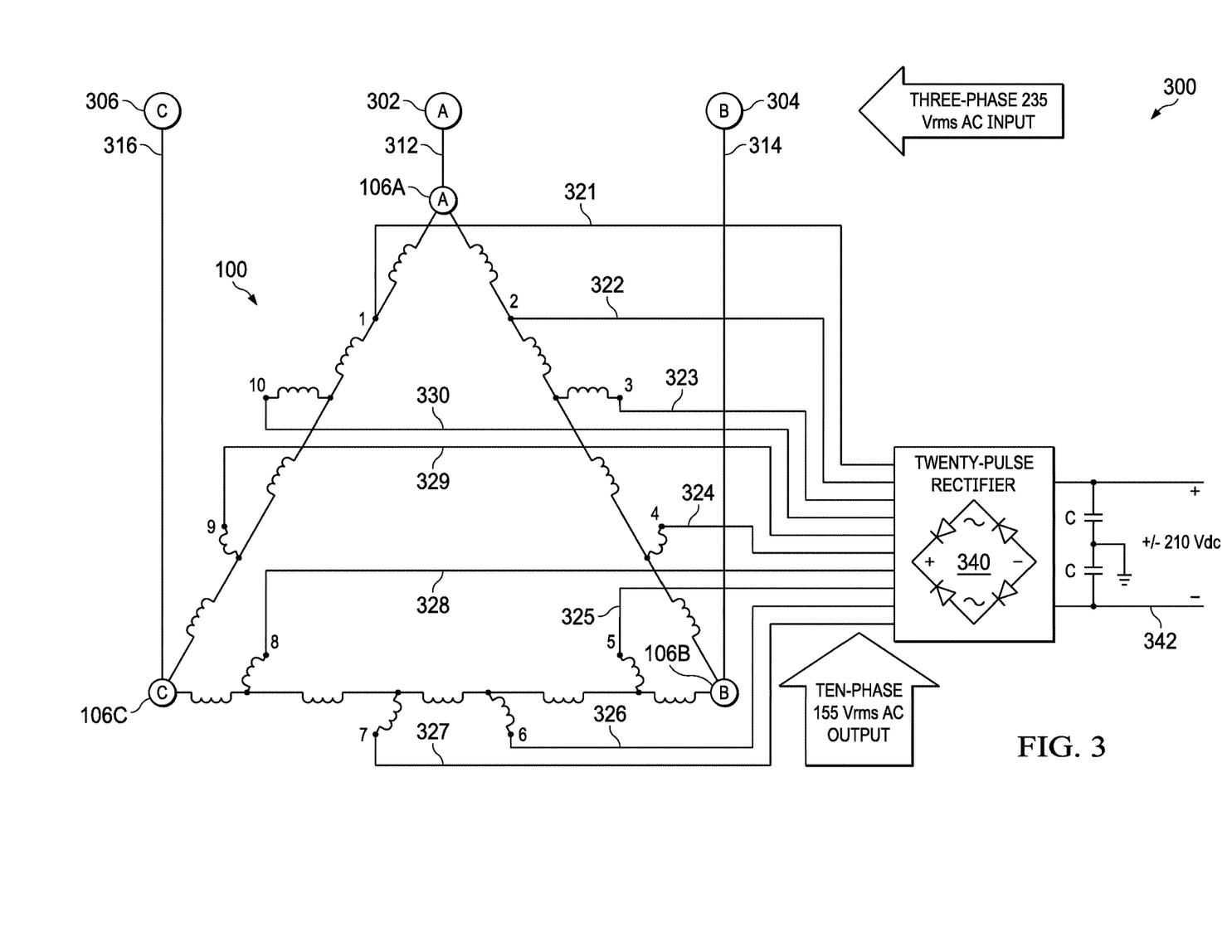
FIG. 3 depicts an illustration of a schematic diagram of a transformer rectifier unit in accordance with an illustrative embodiment.

FIG. 3 depicts an illustration of a schematic diagram of an auto transformer rectifier unit (ATRU) in accordance with an illustrative embodiment. In this illustrative example, ATRU 300 includes winding diagram 100 from FIG. 1.

As depicted, the ATRU 300 is configured to receive alternating currents 302, 304, 406 through lines 312, 314, 316, respectively, connected to external junctions 106A, 106B, 106C, respectively. Alternating currents 302, 304, 306 can be received from an alternating current power supply having a voltage level of about 235 volts (See FIG. 5).

Lines 321-330 carry the phase-shifted alternating currents produced in the primary and secondary windings to rectifier 340.

Rectifier 340 is configured to form direct current power supply 342 in response to receiving the phase-shifted alternating currents. Direct current power supply 342 can provide a dual-polarity output voltage having a positive voltage of about +210 volts and a negative voltage of about −210 volts.

Figure 4:
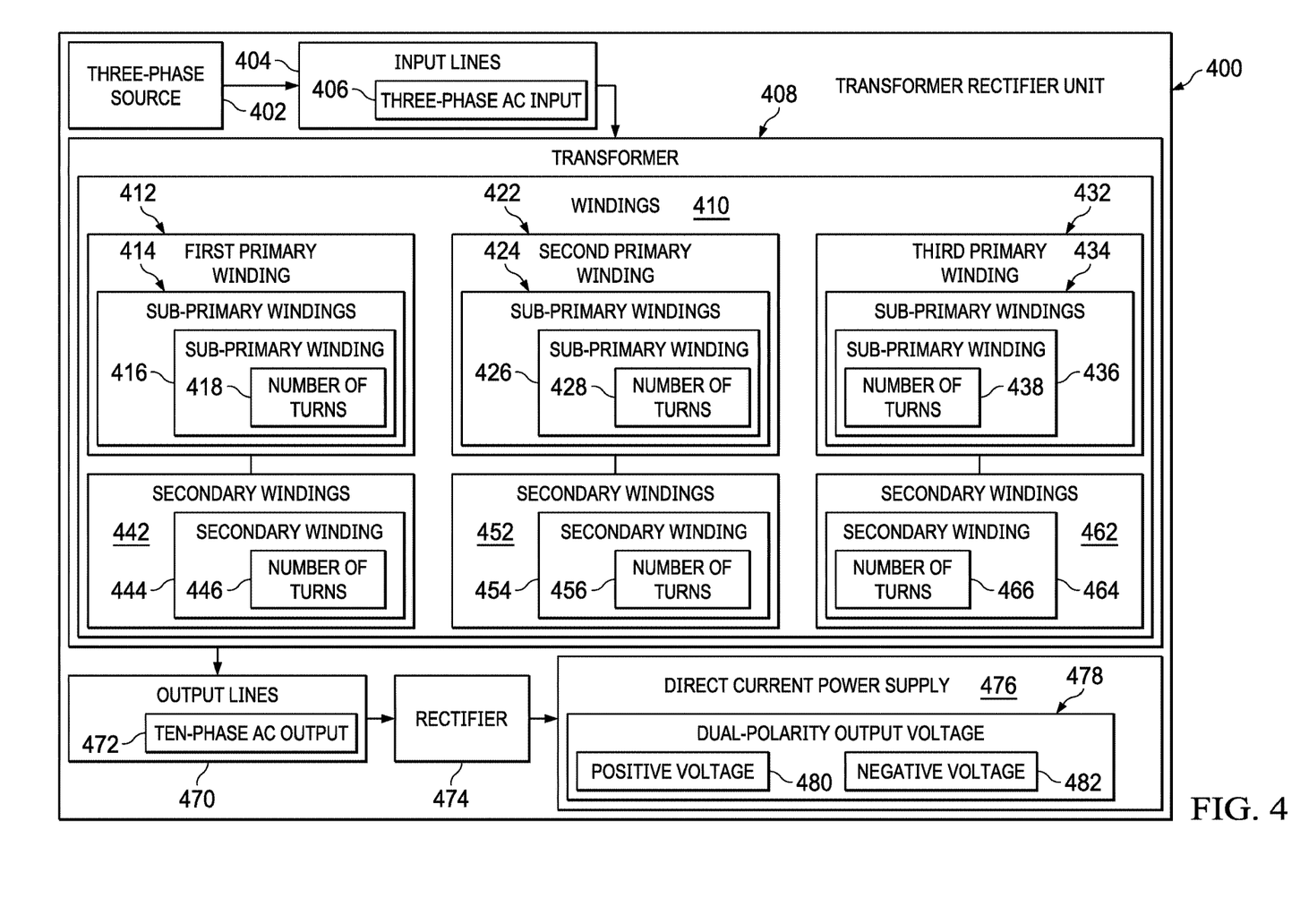
FIG. 4 a block diagram of an auto transformer rectifier unit in accordance with an illustrative embodiment.

FIG. 4 a block diagram of an auto transformer rectifier unit in accordance with an illustrative embodiment. In this illustrative example, ATRU 400 is an example implementation of ATRU 300 in FIG. 3 and comprises transformer 408 and rectifier 474.

The transformer 408 is configured to receive a currently input 406 from a source 402. Source 402 is configured to provide three-phase alternating current power.

Source 402 can take a number of different forms, depending on the implementation. In one illustrative example, source 402 might comprise a variable frequency constant voltage generator (VFCVG).

Transformer 408 receives the three-phase AC input 406 from source 402 through input lines 404. As used herein, a "line," such as one of input lines 404, can comprise any number of electrical lines, wires, or leads configured to carry electrical current. The alternating voltage carried along any one of input lines 404 be measured with respect to a neutral point or ground.

Transformer 408 comprises a number of windings 410. Each the windings 410 may take the form of a coil having one or more turns and comprised of a conductive material. The conductive material may be, for example, without limitation, aluminum, copper, a metal alloy, or some other type of conductive material.

In this illustrative example, the number of windings 410 includes a first primary winding 412, a second primary winding 422, and a third primary winding 432, which together form a delta configuration as shown in FIG. 1. Each of the primary windings 412, 422, 422 in turn comprises a number of sub-primary windings and secondary windings that are coupled to the primary windings.

First primary winding 412 comprises a number of sub-primary windings 414, which might correspond to sub-primary windings 102A1-102A4. Each sub-primary winding 416 has a selected number of turns 418. Coupled to the first primary winding 412 are a first number of secondary windings 442, which might correspond to secondary windings 104A1-104A2. Each secondary winding 444 also has a selected number of turns 446.

Similarly, second primary winding 422 comprises a number of sub-primary windings 424, which might correspond to sub-primary windings 102B1-102B5. Each sub-primary winding 426 has a selected number of turns 428. Coupled to the second primary winding 412 are a second number of secondary windings 452, which might correspond to secondary windings 104B1-104B4. Each secondary winding 454 has a selected number of turns 456.

Third primary winding 432 comprises a number of sub-primary windings 434, which might correspond to sub-primary windings 102C1-102C4. Each sub-primary winding 436 has a selected number of turns 438. Coupled to the third primary winding 432 are a third number of secondary windings 462, which might correspond to secondary windings 104C1-104C2. Each secondary winding 464 has a selected number of turns 466.

The selected number of turns 418, 428, 438, 446, 456, 466 are chosen to generate the desired phase shifts needed to produce the phase-shifted AC output 472.

First primary winding 412, second primary winding 422, and third primary winding 432 are configured to receive a separate phase of three-phase AC input 406, with each phase separated by approximately 120 degrees.

The ten-phase AC output 472 is carried from carried from the third windings 410 to rectifier 474 through output lines 470. Ten-phase AC output 472 comprises ten phase-shifted alternating currents having phases offset by about 36 degrees relative to each other. In this manner, ten-phase AC output 472 forms an input for rectifier 474.

In response to receiving ten-phase AC output 472 from transformer 408, rectifier 474 creates direct current power supply 476. In particular, rectifier 474 forms direct current power supply 476 having dual-polarity output voltage 478, which comprises positive voltage 480 and negative voltage 482 having the same magnitude.

The illustration of ATRU 400 in FIG. 4 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figures 5, 6:
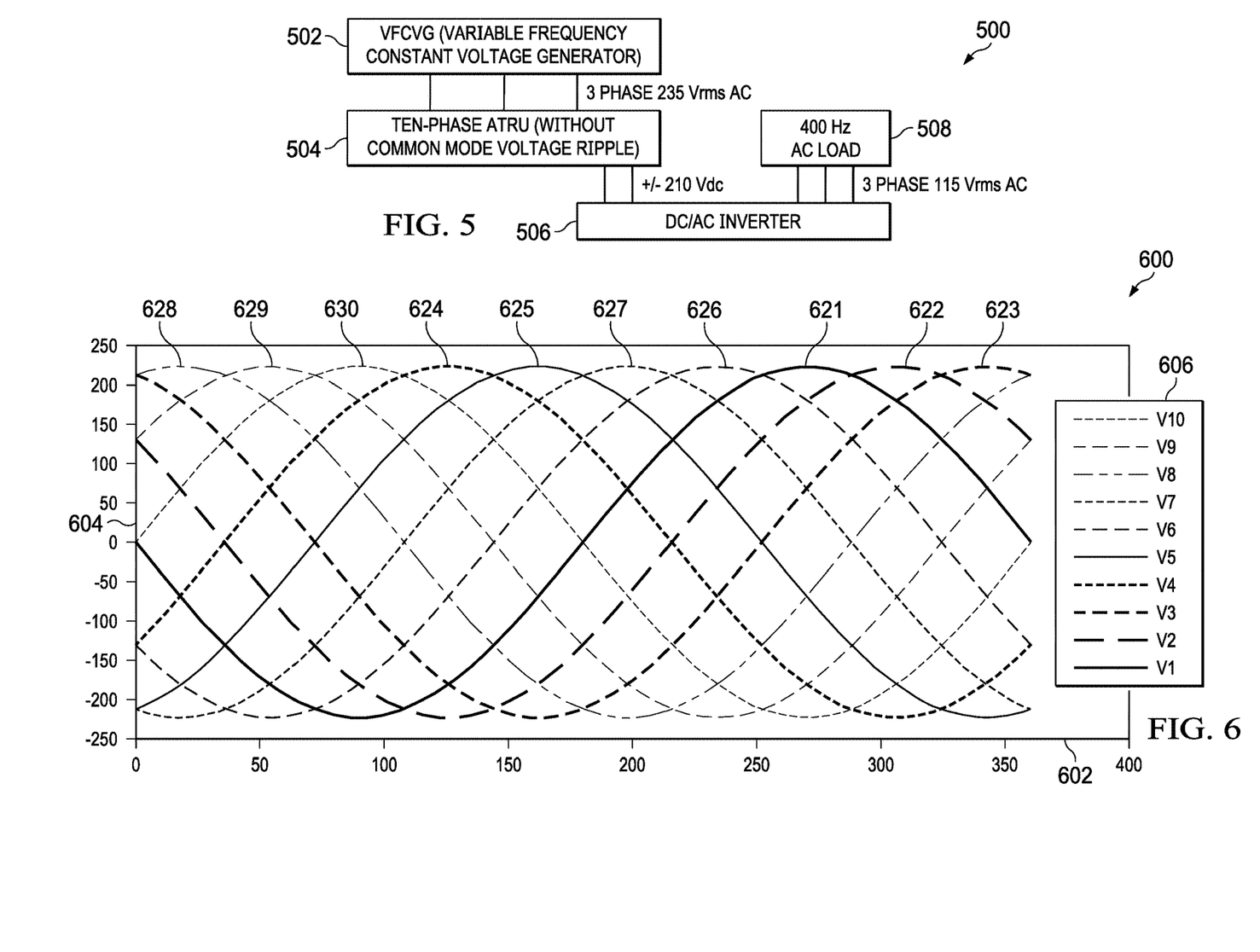
FIG. 5 depicts a block diagram for system for converting variable frequency alternating current to constant frequency alternating current in accordance with an illustrative embodiment.
FIG. 6 is an illustration of a graph of voltages in accordance with an illustrative embodiment.

FIG. 5 depicts a block diagram for system for converting variable frequency alternating current to constant frequency alternating current in accordance with an illustrative embodiment. In this illustrative example, system 500 comprises a VFCVG 502 that generates a three-phase 235 Vrms alternating current.

This three-phase AC is fed to ATRU 504, which might comprise ATRU 300 in FIG. 3. ATRU 504 converts the three-phase 235 Vrms alternating current to a bipolar 210 V direct current, which is fed into DC/AC inverter 506.

The DC/AC inverter 506 converts the bipolar 210 V direct current to three-phase 115 Vrms AC output, which is fed to 400 Hz AC load 508.

With reference now to FIG. 6, an illustration of a graph of voltages is depicted in accordance with an illustrative embodiment. In this illustrative example, graph 600 includes horizontal axis 602 and vertical axis 604. Horizontal axis 602 is phase in degrees. Vertical axis 604 is voltage level.

As indicated by legend 606, lines 621-630 are the respective voltages of lines 321-330 to rectifier 340 in FIG. 3. In this illustrative example, the voltage of a line, such as the voltage of line 325, can be measured with respect to ground or some neutral point. As depicted, the phases of the voltages illustrated by lines 621-630 are offset by about 36 degrees relative to each other.

Figure 7:
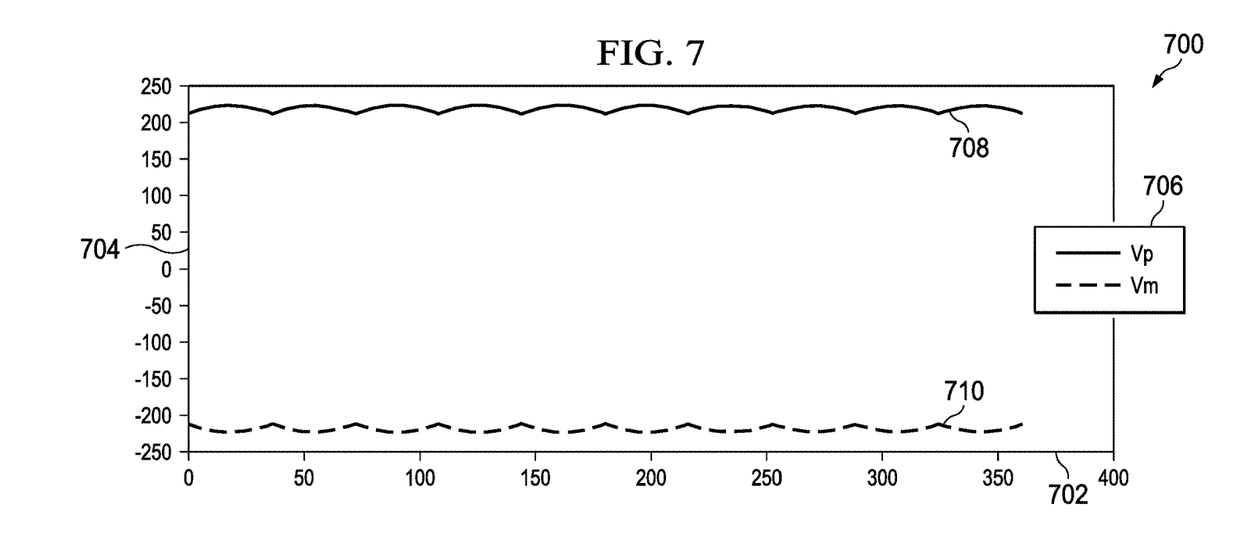
FIG. 7 is an illustration of a graph of voltages in accordance with an illustrative embodiment.

With reference now to FIG. 7, an illustration of a graph of voltages is depicted in accordance with an illustrative embodiment. In this illustrative example, graph 700 includes horizontal axis 702 and vertical axis 704. Horizontal axis 702 is phase in degrees. Vertical axis 704 is voltage level.

As indicated by legend 706, line 708 represented the positive voltage of the dual-polarity output voltage of direct current power supply 342 formed by rectifier 340 in FIG. 3, and Line 710 represents the negative voltage of the dual-polarity output voltage. As depicted, one cycle of the positive voltage and the negative voltage includes 20 pulses.

Figure 8:
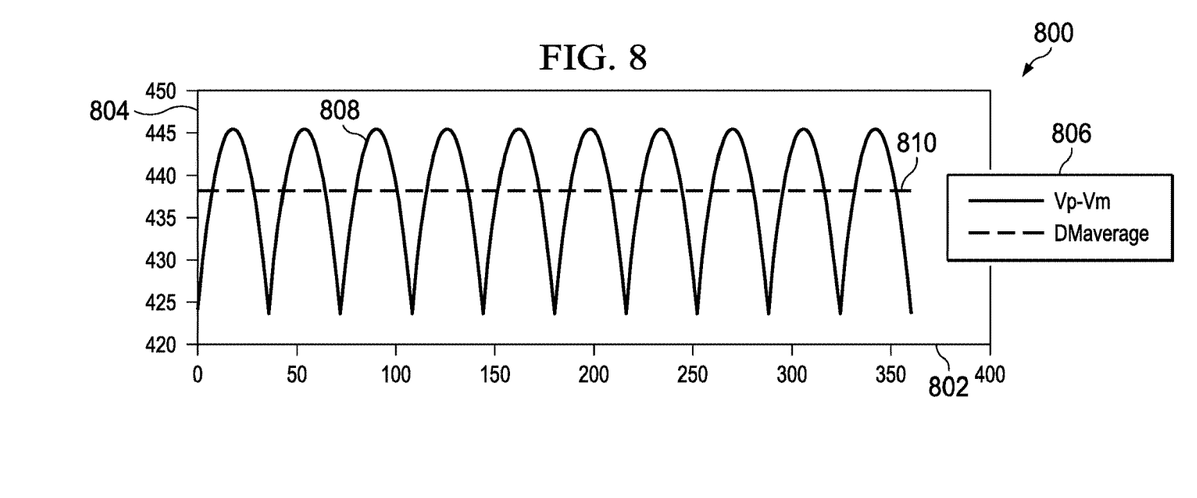
FIG. 8 is an illustration of a graph of differential mode voltage and average voltage in accordance with an illustrative embodiment.

With reference now to FIG. 8, an illustration of a graph of differential mode voltage and average voltage is depicted in accordance with an illustrative embodiment. In this illustrative example, graph 800 includes horizontal axis 802 and vertical axis 804. Horizontal axis 802 is phase in degrees. Vertical axis 804 is voltage level.

As indicated by legend 806, line 808 is differential mode voltage and line 810 is average voltage. The differential mode voltage is the differential mode voltage of direct current power supply 342 formed by rectifier 340 in FIG. 3. The average voltage is the average of the dual-polarity output voltage of direct current power supply 342 formed by rectifier 340 in FIG. 3.

Figure 9:
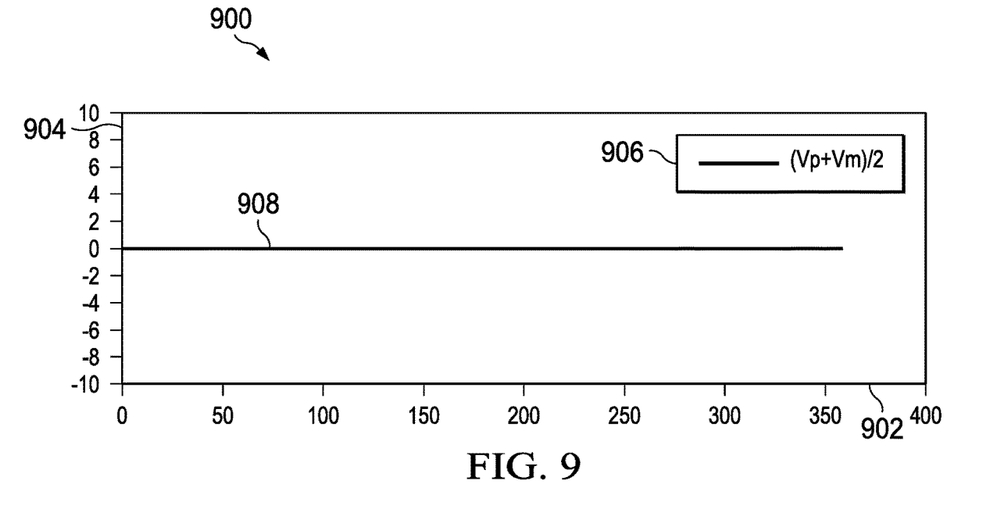
FIG. 9 is an illustration of a graph of common mode voltage in accordance with an illustrative embodiment.

With reference now to FIG. 9, an illustration of a graph of common mode voltage is depicted in accordance with an illustrative embodiment. In this illustrative example, graph 900 includes horizontal axis 902 and vertical axis 904. Horizontal axis 902 is phase in degrees. Vertical axis 904 is voltage level.

As indicated by legend 906, line 908 is the common mode voltage of direct current power supply 342 formed by rectifier 340 in FIG. 3. As depicted, the common mode voltage is substantially zero. In other words, direct current power supply 342 formed by rectifier 340 in FIG. 3 has a common mode voltage of substantially zero.

Figure 10:
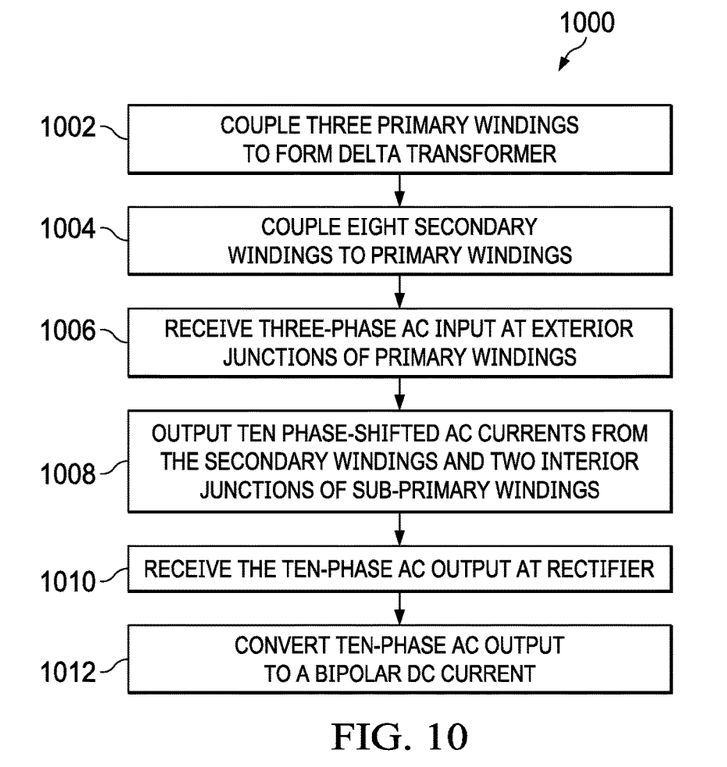
FIG. 10 depicts a flowchart of a process for converting three-phase AC current to ten-phase AC current in accordance with illustrative embodiments.

FIG. 10 depicts a flowchart of a process for converting three-phase AC current to ten-phase AC current in accordance with illustrative embodiments. Process 1000 can be implemented with ATRU 300 Depicts in FIG. 3.

Process 1000 begins by coupling three primary windings together to form a delta configuration transformer (step 1002) in which each primary winding comprises a number of sub-primary windings. Eight secondary windings are coupled to the primary windings (step 1004). Two of the primary windings have two secondary windings coupled to them each. The third primary winding has four secondary windings.

A three-phase AC input is received at the exterior junctions of the primary windings (step 1006). The transformer outputs ten phase-shifted AC currents from the eight secondary windings and two interior junctions of sub-primary windings, producing a ten-phase AC output from the three-phase AC input (step 1008). In an illustrative embodiment, the output currents have a phase difference of 36° between them.

The ten-phase AC output is received by rectifier (step 1010), which converts the ten-phase AC to a bipolar 20-pulse DC current (step 1012).

As used herein, a first component "connected to" or "coupled to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a transformer configured to receive a three-phase alternating current and produce a ten-phase alternating current output, wherein the transformer comprises:
only three external junctions, one each located between a first primary winding, a second primary winding, and a third primary winding, wherein the first, second, and third primary windings are coupled in a delta configuration such that the first primary winding connects to:
a first single secondary winding oriented parallel to the second primary winding, and
a single secondary winding oriented parallel to the third primary winding; and
a rectifier configured to receive the ten-phase alternating current output and output a bipolar direct current that comprises a common mode voltage of zero.

2. The apparatus of claim 1, wherein the third primary winding is connected to: a second single secondary winding parallel to the second primary winding, and a single secondary winding parallel to the first primary winding.

3. The apparatus of claim 2, wherein the first and third of the primary windings each respectively comprise only four sub-primary windings and the second primary winding comprises only five additional sub-primary windings.

4. The apparatus of claim 2, wherein only eight secondary windings in total are coupled to all the primary windings.

5. The apparatus of claim 4, wherein the eight secondary windings, a first interior junction located between sub-wirings of the first primary winding, and a second interior junction located between sub-wirings of the third primary winding connect to output lines for the ten-phase alternating current.

6. The apparatus of claim 1, further comprising:
two adjacent secondary windings magnetically coupled to the first primary winding and physically connected to the second primary winding; and
two additional adjacent secondary windings magnetically coupled to the third primary winding and physically connected to the second primary winding.

7. The apparatus of claim 6, further comprising:
a secondary winding physically connected to the third primary winding and magnetically coupled to the first primary winding.

8. The apparatus of claim 1, wherein:
the three-phase alternating current is 235 Volts root mean square; and
the ten-phase alternating current output is 155 Volts root mean square.

9. The apparatus of claim 1, wherein the bipolar direct current output by the rectifier is 210 Volts.

10. The apparatus of claim 1, wherein each phase of the ten-phase alternating current is offset by approximately 36 degrees relative to each other.

11. A transformer, comprising:
a first primary winding that comprises only four sub-primary windings;
only eight secondary windings, wherein a first two of the eight secondary windings physically couple to the first primary winding;
a second primary winding that comprises only five additional sub-primary windings;
only four of the eight secondary windings physically coupled to the second primary winding, such that only two of the four secondary windings physically coupled to the second primary winding magnetically couple with the first primary wiring and only an additional two of the four secondary windings physically coupled to the second primary winding magnetically couple with a third primary winding that comprises only four more sub-primary windings;
only three exterior junctions, one each located between the first primary winding, the second primary winding, and the third primary winding and configured to receive an alternating current input;
only two of the eight secondary windings physically coupled to the third primary winding;
wherein the first primary winding, the second primary winding, and the third primary winding are coupled in a delta configuration; and
wherein all of the eight secondary windings, one interior junction between adjacent sub-windings on the first primary winding, and one interior junction between adjacent sub-windings on the third primary winding are configured to output phase-shifted alternating currents that are offset relative to each other by one-tenth of a cycle in phase.

12. The transformer of claim 11, wherein:
only one of the two secondary windings physically coupled to the third primary winding is magnetically coupled to the first primary winding;
only one of the two secondary windings physically coupled to the first primary winding is magnetically coupled to the second primary winding; and
only one of the two secondary windings physically coupled to the first primary winding is magnetically coupled to the third primary winding.

13. The transformer of claim 11, wherein the only three exterior junctions between the primary windings each receive a 235 Volt root mean square alternating current.

14. The transformer of claim 11, wherein the phase-shifted alternating currents output from the secondary windings and two interior junctions comprise 155 Volt root mean square alternating currents.

15. An auto transformer rectifier unit, comprising:
a transformer configured to receive three input alternating currents offset relative to each other by a third of a cycle in phase and output ten phase-shifted alternating currents offset relative to each other by one-tenth of a cycle in phase, wherein the transformer comprises:
a first primary winding that comprises only a first four sub-primary windings;
only eight secondary windings, wherein only a first and second secondary windings connect to the first primary winding;
a second primary winding that comprises only five sub-primary windings;
only a third through sixth secondary windings connected to the second primary winding; and
a third primary winding that comprises only an additional four sub-primary windings, such that the first primary winding the second primary winding and the third primary winding are coupled in a delta configuration and only a seventh and eighth secondary windings connect to the third primary winding; and a rectifier configured to receive the ten phase-shifted alternating currents from the transformer and output a bipolar direct current that comprises a common mode voltage of zero.

16. The auto transformer rectifier unit of claim 15, wherein:
   two adjacent secondary windings physically connected to the second primary winding are magnetically coupled to the first primary winding; and
   two additional adjacent secondary windings physically connected to the second primary winding are magnetically coupled to the third primary winding.

17. The auto transformer rectifier unit of claim 16, wherein:
   only three of the secondary windings are magnetically coupled to the first primary winding;
   two of the secondary windings are magnetically coupled to the second primary winding; and
   three of the secondary windings are magnetically coupled to the third primary winding.

18. The auto transformer rectifier unit of claim 15, wherein the three input alternating currents are 235 Volts root mean square.

19. The auto transformer rectifier unit of claim 15, wherein the ten phase-shifted output alternating currents are 155 Volts root mean square.

20. The auto transformer rectifier unit of claim 15, wherein the bipolar direct current output by the rectifier is 210 Volts.

* * * * *